US008297159B2

(12) United States Patent
Voruganti et al.

(10) Patent No.: US 8,297,159 B2
(45) Date of Patent: Oct. 30, 2012

(54) TABLE SAW WITH DROPPING BLADE

(75) Inventors: Ravinder Voruganti, Lake Barrington, IL (US); Ralph Dammertz, Palatine, IL (US); Thomas Siwek, North Aurora, IL (US); Srinath Srinivas, Schaumburg, IL (US); Daniel J. Williams, Chicago, IL (US); Stephen M. Oshgan, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 462 days.

(21) Appl. No.: 12/548,347

(22) Filed: Aug. 26, 2009

(65) Prior Publication Data

US 2011/0048196 A1 Mar. 3, 2011

(51) Int. Cl.

| | |
|---|---|
| ***B23D 45/06*** | (2006.01) |
| ***B05B 15/02*** | (2006.01) |
| ***B26D 7/22*** | (2006.01) |
| ***B27G 19/02*** | (2006.01) |

(52) U.S. Cl. ............... 83/477.2; 83/58; 83/62.1; 83/564

(58) Field of Classification Search ................. 83/477.2, 83/62.1, 58, 471.3, DIG. 1, 471.2, 581, 478, 83/490, 663, 781, 564; 144/384, 391, 427, 144/154.5, 356; 324/688, 661; 318/16, 480; 340/686.5, 686.6, 532

See application file for complete search history.

(56) References Cited

U.S. PATENT DOCUMENTS

| | | | | |
|---|---|---|---|---|
| 2,505,958 | A | 5/1950 | Grierson | |
| 2,652,863 | A | 9/1953 | Grabinski | |
| 2,719,547 | A | 10/1955 | Gjerde | |
| 2,844,173 | A | 7/1958 | Gaskell | |
| 2,898,893 | A | 8/1959 | Rohrer et al. | |
| 2,903,848 | A | 9/1959 | Mayhew et al. | |
| 2,937,672 | A | 5/1960 | Gjerde | |
| 3,013,592 | A | 12/1961 | Ambrosio et al. | |
| 3,036,608 | A * | 5/1962 | Carl Weber | 144/285 |
| 3,320,740 | A | 5/1967 | Hamkins | |

(Continued)

FOREIGN PATENT DOCUMENTS

| | | |
|---|---|---|
| DE | 20007037 | 7/2000 |

(Continued)

OTHER PUBLICATIONS

Photograph of Mafell Erika 70Ec Pull-Push saw, downloaded Oct. 29, 2009 from http://www.maschinensucher.de/ma2/bilderanzeigen-A600704-1-english.html.

*Primary Examiner* — Ghassem Alie

(74) *Attorney, Agent, or Firm* — Maginot, Moore & Beck

(57) ABSTRACT

A power tool in one embodiment is a table saw which includes a latch hold mechanism, a swing arm movable along a swing arm path between a first position adjacent the latch hold mechanism and a second position spaced apart from the latch hold mechanism, a latch movable between a first position whereat the swing arm is maintained at the first position and a second position whereat the swing arm is not maintained at the first position, an actuating device configured to transfer a force to the swing arm when the swing arm is maintained at the first position, and a control system configured to control the actuating device to transfer a force to the swing arm when the swing arm is maintained at the first position sufficient to move the latch from the first position to the second position.

16 Claims, 6 Drawing Sheets

U.S. PATENT DOCUMENTS

| | | | | |
|---|---|---|---|---|
| 3,344,819 | A | 10/1967 | Mitchell | |
| 3,954,051 | A | 5/1976 | Steiniger | |
| 4,161,272 | A | 7/1979 | Brockl | |
| 4,184,394 | A | 1/1980 | Gjerde | |
| 4,336,733 | A * | 6/1982 | Macksoud | 83/477.2 |
| 4,616,447 | A | 10/1986 | Haas et al. | |
| 4,962,685 | A | 10/1990 | Hagstrom | |
| 5,676,319 | A | 10/1997 | Stiggins et al. | |
| 5,819,625 | A | 10/1998 | Sberveglieri | |
| 6,036,608 | A | 3/2000 | Morris | |
| 6,530,303 | B1 | 3/2003 | Parks et al. | |
| 6,536,536 | B1 | 3/2003 | Gass et al. | |
| 6,813,983 | B2 | 11/2004 | Gass et al. | |
| 6,826,988 | B2 | 12/2004 | Gass et al. | |
| 6,834,730 | B2 | 12/2004 | Gass et al. | |
| 6,857,345 | B2 | 2/2005 | Gass et al. | |
| 6,877,410 | B2 | 4/2005 | Gass et al. | |
| 6,880,440 | B2 | 4/2005 | Gass et al. | |
| 6,920,814 | B2 | 7/2005 | Gass et al. | |
| 6,922,153 | B2 | 7/2005 | Pierga et al. | |
| 6,945,148 | B2 | 9/2005 | Gass et al. | |
| 6,945,149 | B2 | 9/2005 | Gass et al. | |
| 6,957,601 | B2 | 10/2005 | Gass et al. | |
| 6,994,004 | B2 | 2/2006 | Gass et al. | |
| 6,997,090 | B2 | 2/2006 | Gass et al. | |
| 7,000,514 | B2 | 2/2006 | Gass et al. | |
| 7,024,975 | B2 | 4/2006 | Gass et al. | |
| 7,029,384 | B2 | 4/2006 | Steimel et al. | |
| 7,055,417 | B1 | 6/2006 | Gass | |
| 7,077,039 | B2 | 7/2006 | Gass et al. | |
| 7,093,668 | B2 | 8/2006 | Gass et al. | |
| 7,098,800 | B2 | 8/2006 | Gass | |
| 7,100,483 | B2 | 9/2006 | Gass et al. | |
| 7,121,358 | B2 | 10/2006 | Gass et al. | |
| 7,137,326 | B2 | 11/2006 | Gass et al. | |
| 7,171,879 | B2 | 2/2007 | Gass et al. | |
| 7,197,969 | B2 | 4/2007 | Gass et al. | |
| 7,210,383 | B2 | 5/2007 | Gass et al | |
| 7,225,712 | B2 | 6/2007 | Gass et al. | |
| 7,228,772 | B2 | 6/2007 | Gass | |
| 7,231,856 | B2 | 6/2007 | Gass et al. | |
| 7,284,467 | B2 | 10/2007 | Gass et al. | |
| 7,290,472 | B2 | 11/2007 | Gass et al. | |
| 7,290,967 | B2 | 11/2007 | Steimel et al. | |
| 7,308,843 | B2 | 12/2007 | Gass et al. | |
| 7,328,752 | B2 | 2/2008 | Gass et al. | |
| 7,347,131 | B2 | 3/2008 | Gass | |
| 7,350,444 | B2 | 4/2008 | Gass et al. | |
| 7,350,445 | B2 | 4/2008 | Gass et al. | |
| 7,353,737 | B2 | 4/2008 | Gass et al. | |
| 7,357,056 | B2 | 4/2008 | Gass et al. | |
| 7,359,174 | B2 | 4/2008 | Gass | |
| 7,377,199 | B2 | 5/2008 | Gass et al. | |
| 7,421,315 | B2 | 9/2008 | Gass et al. | |
| 7,472,634 | B2 | 1/2009 | Gass et al. | |
| 7,475,542 | B2 | 1/2009 | Borg et al. | |
| 7,481,140 | B2 | 1/2009 | Gass et al. | |
| 7,509,899 | B2 | 3/2009 | Gass et al. | |
| 7,525,055 | B2 | 4/2009 | Gass et al. | |
| 7,536,238 | B2 | 5/2009 | Gass | |
| 7,540,334 | B2 | 6/2009 | Gass et al. | |
| 7,591,210 | B2 | 9/2009 | Gass et al. | |
| 7,600,455 | B2 | 10/2009 | Gass et al. | |
| 7,628,101 | B1 * | 12/2009 | Knapp et al. | 83/62.1 |
| 7,698,975 | B2 * | 4/2010 | Peot et al. | 83/58 |
| 7,721,633 | B2 | 5/2010 | Gaw | |
| 8,065,943 | B2 | 11/2011 | Gass et al. | |
| 2002/0020265 | A1 | 2/2002 | Gass et al. | |
| 2003/0089212 | A1 | 5/2003 | Parks et al. | |
| 2004/0035595 | A1 | 2/2004 | Fisher | |
| 2004/0159198 | A1 | 8/2004 | Peot et al. | |
| 2005/0166736 | A1 | 8/2005 | Gass et al. | |
| 2005/0268767 | A1 | 12/2005 | Pierga et al. | |
| 2007/0074612 | A1 | 4/2007 | Yu | |

FOREIGN PATENT DOCUMENTS

| | | |
|---|---|---|
| DE | 202004012468 | 11/2004 |

* cited by examiner

TABLE SAW WITH DROPPING BLADE

FIELD

The present disclosure relates to power tools and more particularly to power tools with exposed shaping devices.

BACKGROUND

A number of power tools have been produced to facilitate forming a work piece into a desired shape. One such power tool is a table saw. A wide range of table saws are available for a variety of uses. Some table saws such a cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed. Accordingly, each time the safety device is actuated; significant resources must be expended to replace the blade and the braking member. Another shortcoming of this type of safety device is that the shaping device must be toothed. Moreover, if a spare blade and braking member are not on hand, a user must travel to a store to obtain replacements. Thus, while effective, this type of safety system can be expensive and inconvenient.

In view of the foregoing, it would be advantageous to provide a power tool with a safety system that does not interfere with shaping procedures. A safety system that did not damage the blade or other shaping device when the safety system is activated would be further advantageous. A further advantage would be realized by a safety system that could be repeatedly activated without the need for replacement parts.

SUMMARY

In accordance with one embodiment, a table saw includes a latch hold mechanism, a swing arm movable along a swing arm path between a first swing arm position adjacent the latch hold mechanism and a second swing arm position spaced apart from the latch hold mechanism, a latch movable between a first latch position whereat the swing arm is maintained at the first swing arm position and a second latch position whereat the swing arm is not maintained at the first swing arm position, an actuating device configured to transfer a force to the swing arm when the swing arm is maintained at the first swing arm position resulting in a bias on the latch in a direction toward the second latch position, and a control system configured to control the actuating device to transfer a force to the swing arm when the swing arm is maintained at the first swing arm position sufficient to move the latch from the first latch position to the second latch position.

In another embodiment, a power tool includes a work-piece support surface, a swing arm assembly movable between a first swing arm position whereat a portion of a shaping device supported by the swing arm assembly extends above the work-piece support surface and a second swing arm position whereat the portion of the shaping device does not extend above the work-piece support surface, an actuator configured to force the swing arm assembly away from the first swing arm position and toward the second swing arm position, and a control system configured to actuate the actuator in response to a sensed condition.

BRIEF DESCRIPTION OF THE DRAWINGS

The accompanying drawings illustrate various embodiments of the present disclosure and together with a description serve to explain the principles of the disclosure.

Corresponding reference characters indicate corresponding parts throughout the several views. Like reference characters indicate like parts throughout the several views.

DETAIL DESCRIPTION OF THE DISCLOSURE

Figure 1:
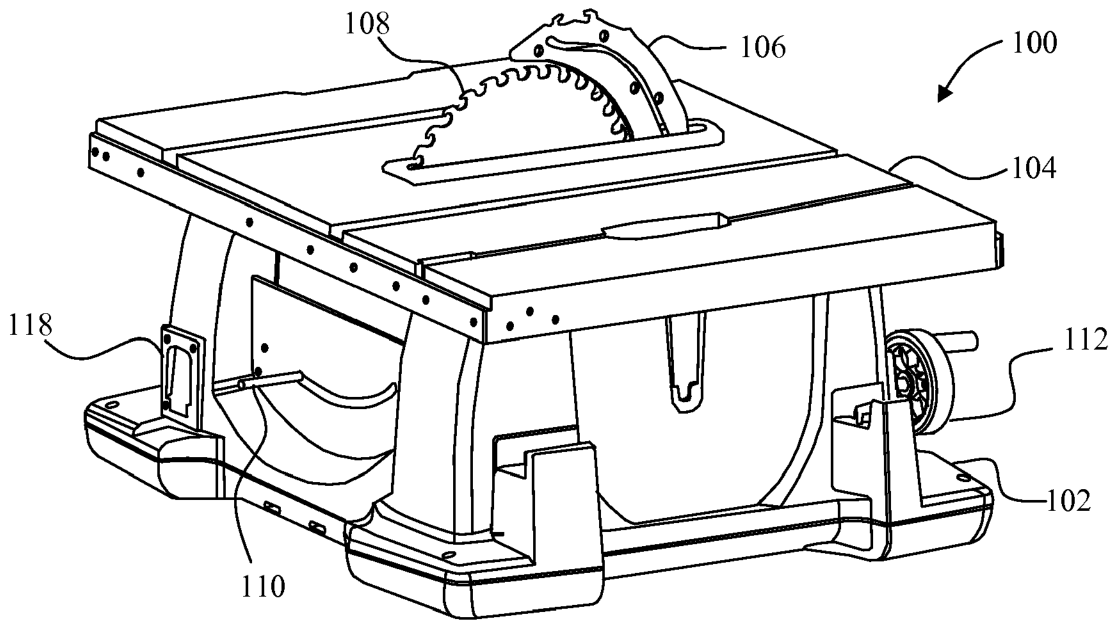
FIG. 1 depicts a top perspective view of a table saw incorporating a mitigation system in accordance with principles of the invention.

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the intention is to cover all modifications, equivalents, and alternatives falling within the spirit and scope of the invention as defined by the appended claims.

Referring to FIG. 1, a table saw 100 is shown. The table saw 100 includes a base housing 102 and a work-piece support surface 104. A riving knife or splitter 106 is positioned adjacent to a blade 108 which extends from within the base housing 102 to above the work-piece support surface 104. A blade guard (not shown) may be attached to the splitter 106. An angle indicator 110 indicates the angle of the blade 108 with respect to the work-piece support surface 104. A bevel adjust turn-wheel 112 may be used to establish the angle of the blade 108 with respect to the work-piece support surface 104 by pivoting a frame 114 (shown in FIG. 2) within the base housing 102.

The frame 114 supports a motor 116 which is powered through a switch 118 located on the base housing 102. The frame 114 further supports a carriage assembly 120 and a stop pad 122. The carriage assembly 120 includes a carriage 124 and two guiderails 126/128. The position of the carriage 124 along the guiderails 126/128 is controlled by a blade height turn-wheel 130 through a gearing assembly 132. The carriage 124 fixedly supports a latch assembly 140 and pivotably supports a swing arm assembly 142.

Figure 3:
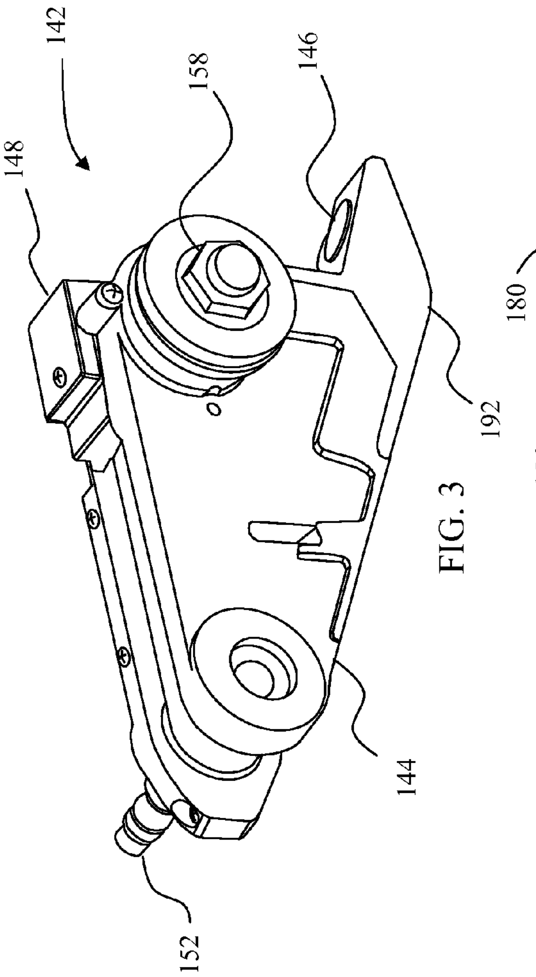
FIG. 3 depicts a perspective view of the swing arm assembly of the table saw of FIG. 1.
Figure 4:
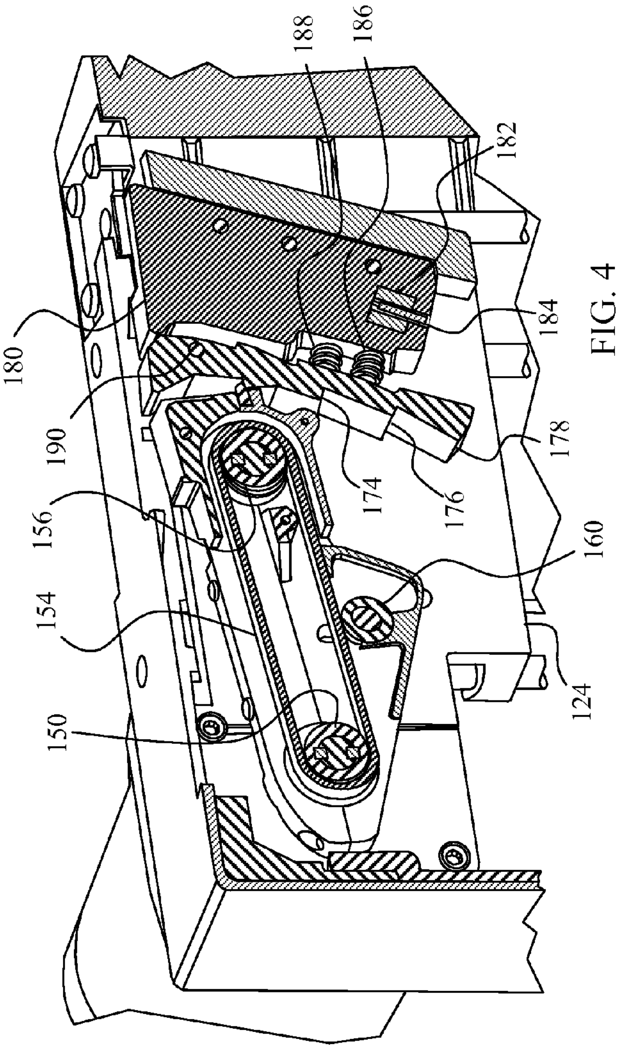
FIG. 4 depicts a partial perspective cross-sectional view of the swing arm assembly of FIG. 3 supported by a latch assembly including a latch hold that is biased against the swing arm assembly.

The swing arm assembly 142, also shown in FIGS. 3 and 4, includes a housing 144. A strike plate 146 and a rebound plate 148 are mounted on the housing 144. The housing 144 encloses a power wheel 150 that is driven by an output shaft 152 of the motor 116. A belt 154 transfers rotational movement from the power wheel 150 to a blade wheel 156. A nut 158 is used to affix the blade 108 (not shown in FIGS. 3 and 4 for purpose of clarity) to the blade wheel 156. A tensioner 160 maintains the belt 154 at a desired tension.

Figure 5:
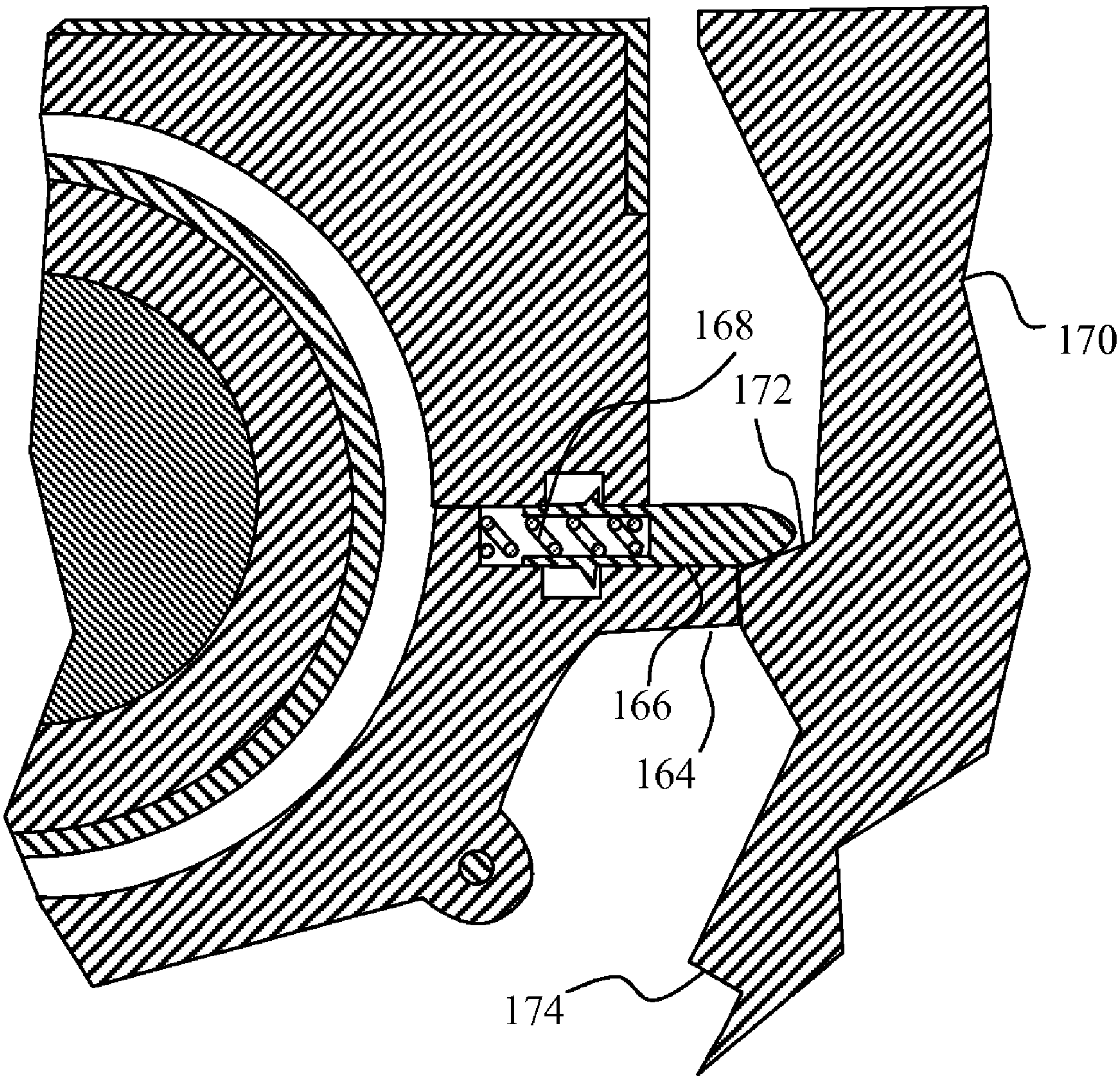
FIG. 5 depicts a partial cross-section view of a swing arm assembly held in position by a latch pin biased against a latch hold.

With additional reference to FIG. 5, the swing arm assembly 142 also includes a lip 164 and a latch pin 166 which is biased by a spring 168 toward a latch hold 170 which is part of the latch assembly 140. The latch hold 170 includes a latch ledge 172 and three rebound ledges 174, 176, and 178 (see FIG. 4). The latch assembly 140 further includes a base 180 and a solenoid 182 with a solenoid pin 184. Two springs 186 and 188 are positioned between the base 180 and the latch hold 170 which is mounted by a pivot 190 to the carriage 124.

Operation of the table saw 100 is described with reference to FIGS. 1-5. Initially, the swing arm assembly 142 is maintained in a latched position with the latch pin 166 resting on the latch ledge 170 as shown in FIG. 5. In this position, the springs 188 and 186 are under compression and exert a bias on the latch hold 170 about the pivot 190 in a clockwise direction as viewed in FIG. 4. The latch hold 170 is thus biased into contact with the lip 164 of the swing arm assembly 142 which restricts rotation of the latch hold 170.

Additionally, the blade wheel 156 is positioned sufficiently close to the work-piece support surface 104 that the blade 108 extends above the work-piece support surface 104 as shown in FIG. 1. A user operates the bevel adjust turn wheel 112 to pivot the frame 114 with respect to the work-piece support surface 104 to establish a desired angle between the blade 108 and the work-piece support surface 104. The user further operates the blade height adjustment turn-wheel 130 to move the carriage 124 along the guiderails 126/128 to establish a desired height of the blade 108 above the work-piece support surface 104.

Using the switch 118, power is then applied to the motor 116 causing the output shaft 152 and the power wheel 150 to rotate. Rotation of the power wheel 150 causes the belt 154 to rotate the blade wheel 156 and the blade 108 which is mounted on the blade wheel 156. A work-piece may then be shaped by moving the work-piece into contact with the blade 108.

The table saw 100 includes a sensing and control circuit (not shown) which activates the solenoid 182 in response to a sensed condition. Any desired sensing and control circuit may be used for this purpose. One acceptable sensing and control circuit is described in U.S. Pat. No. 6,922,153, the entire contents of which are herein incorporated by reference. The safety detection and protection system described in the '153 patent senses an unsafe condition and provides a control signal which, in the table saw 100, is used to actuate the solenoid 182.

Upon actuation of the solenoid 182, the solenoid pin 184 is forced outwardly from the solenoid 182. When the swing arm assembly 142 is maintained in a latched position with the latch pin 166 resting on the latch ledge 170 as shown in FIG. 5, the strike plate 146 is aligned with the solenoid 182. Accordingly, as the solenoid pin 184 is forced out of the solenoid 182, the solenoid pin 184 impacts the strike plate 146.

The shape of the latch pin 166 and the latch ledge 172 is selected such that the impact of the solenoid pin 184 on the strike plate 146 generates a force tending to push the latch pin 166 against the spring 168. The spring constant of the spring 168 and the operating characteristics of the solenoid 182 are selected such that when the solenoid pin 184 impacts the strike plate 146 the generated force is sufficient to compress the spring 168 and to force the latch pin 166 into a position whereat the swing arm assembly 142 is no longer maintained in position adjacent to the latch assembly 140 by the latch pin 166. Consequently, the swing arm assembly 142 pivots about the output shaft 152 in the direction of the arrow 200 of FIG. 6 such that the blade wheel 156 moves away from the work-piece support surface 104 to the position shown in FIG. 6. Accordingly, the blade 108 is pulled by the swing arm assembly 142 in a direction away from the work-piece support surface 104.

As the swing arm assembly 142 continues to move in the direction of the arrow 200, the rebound plate 148 of the swing arm assembly 142 rotates below the rebound ledge 178 of the latch hold 170. At this point, rotation of the latch hold 170 about the pivot 190 is no longer restrained by the swing arm assembly 142. Accordingly, the springs 186 and 188 cause the latch hold 170 to rotate into a position whereat the rebound ledge 178 is located in the swing path of the swing arm 142, that is, the path along which the swing arm 142 moves, as shown in FIG. 7.

Figure 6:
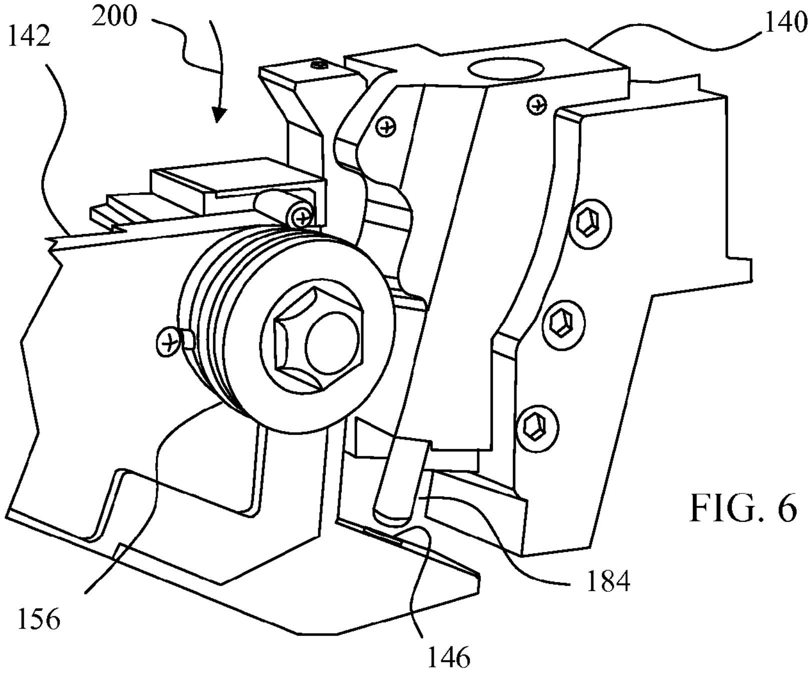
FIG. 6 depicts a partial perspective view of the swing arm assembly and latch assembly of FIG. 1 after the solenoid has been actuated thereby forcing the latch pin off of the latch hold such that the swing arm assembly moves away from the latch assembly.
Figure 7:
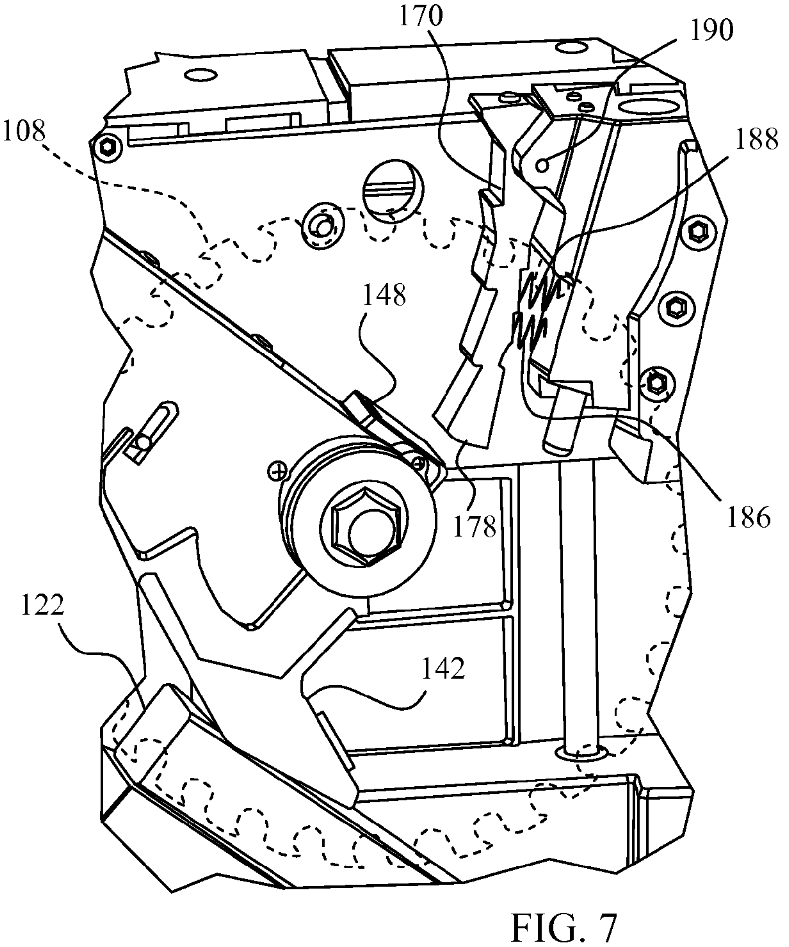
FIG. 7 depicts a partial perspective view of the swing arm assembly and latch assembly of FIG. 1 after the swing arm assembly has cleared the latch hold allowing the latch hold to be biased into the swing path.

The configuration of FIG. 7 further shows the swing arm assembly 142 rotated to a position whereat the swing arm assembly 142 contacts the stop pad 122. Accordingly, further rotation of the swing arm assembly 142 in the direction of the arrow 200 of FIG. 6 is impeded by the stop pad 122. At this position, the blade 108 is completely located below the work-piece support surface 104. Therefore, an operator above the work-piece support surface 104 cannot be injured by the blade 108.

In one embodiment, the stop pad 122 is made with micro-cellular polyurethane elastomer (MPE). MPEs form a material with numerous randomly oriented air chambers. Some of the air chambers are closed and some are linked. Additionally, the linked air chambers have varying degrees of communication between the chambers and the orientation of the linked chambers varies. Accordingly, when the MPE structure is compressed, air in the chambers is compressed. As the air is compressed, some of the air remains within various chambers, some of the air migrates between other chambers and some of the air is expelled from the structure. One such MPE is MH 24-65, commercially available from Elastogran GmbH under the trade name CELLASTO®.

Use of an MPE or other appropriate material in the stop pad 122 stops rotation of the swing arm assembly 142 without damaging the swing arm assembly 142. Prior to impacting the stop pad 122, however, the swing arm assembly 142 may be moving with sufficient force to cause the swing arm assembly to rebound off of the stop pad 122. In such a circumstance, the swing arm assembly 142 will rotate about the output shaft 152 in a counterclockwise direction. Thus, the blade 108 moves toward the work-piece support surface 104. Movement of the blade 108 above the work-piece support surface 104, however, is inhibited by the latch hold 170.

Figure 8:
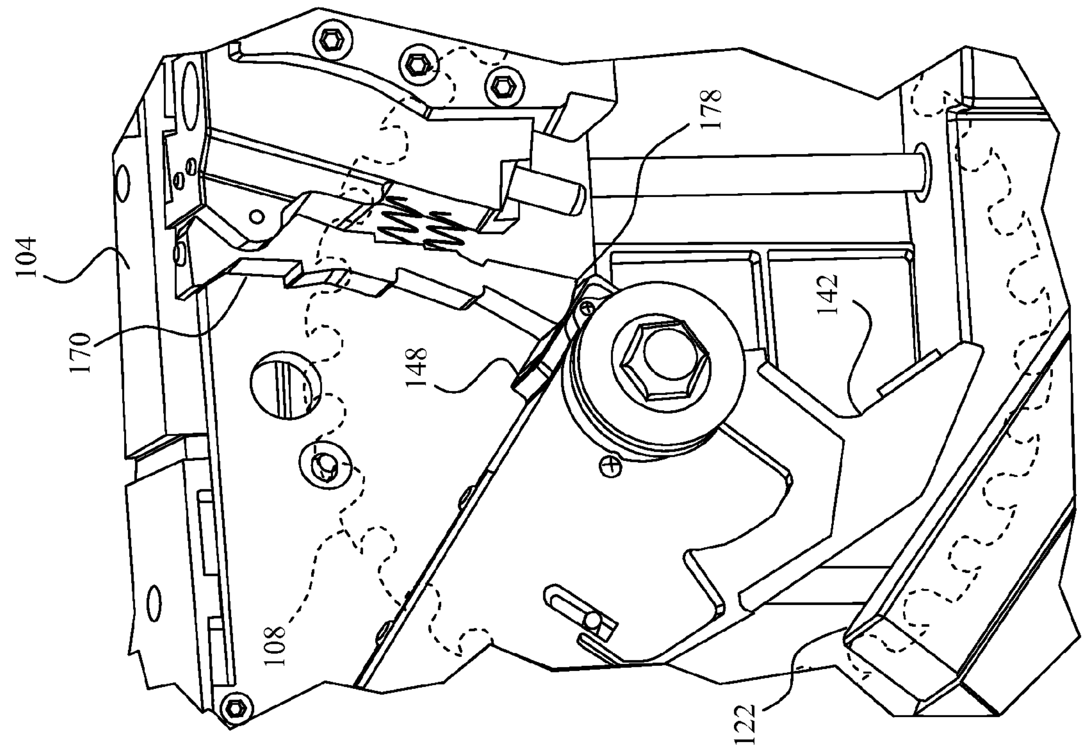
FIG. 8 depicts a partial perspective view of the swing arm assembly and latch assembly of FIG. 1 after the swing arm assembly has rebounded off of the stop pad and has been captured by a latch hold ledge thereby keeping the shaping device below the surface of the work-piece support surface.

Specifically, because the springs 186 and 188 bias the latch hold 170 to a location within the swing path of the swing arm assembly 142, movement of the swing arm assembly 142 toward the work-piece support surface 104 brings the rebound plate 148 into contact with the rebound ledge 178 as shown in FIG. 8. In the position of FIG. 8, the blade 108 remains below the surface of the work-piece support surface 104 even after the swing arm assembly 142 rebounds off of the stop pad 122. Therefore, an operator above the work-piece support surface 104 cannot be injured by the blade 108.

Figure 9:
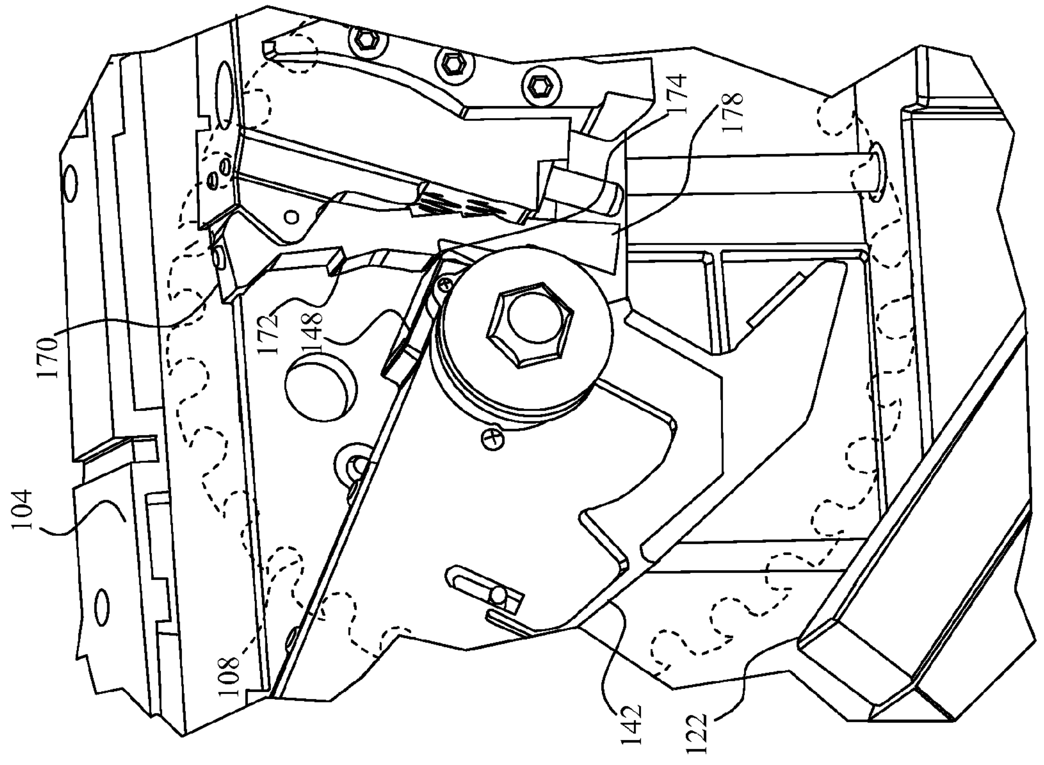
FIG. 9 depicts a partial perspective view of the swing arm assembly and latch assembly of FIG. 1 after the swing arm assembly has rebounded off of the stop pad and has been captured by a secondary latch hold ledge thereby keeping the shaping device below the surface of the work-piece support surface.

In this embodiment, the carriage 124 is movable along the guiderails 126 and 128. Accordingly, the distance between the swing arm assembly 142 and the stop pad 122 when the swing arm assembly 142 is latched to the latch hold 170 will vary. Thus, the distance between the swing arm assembly 142 in the latched position and the stop pad 122 at certain blade heights is such that the swing arm assembly 142 contacts the stop pad 122 before the rebound plate 148 rotates beneath the rebound ledge 178. Accordingly, the rebound ledges 174 and 176 are provided at locations above the rebound ledge 178 to contact the rebound plate 148 when the swing arm assembly 142 is actuated with the carriage 124 positioned closer to the stop pad 122 as depicted in FIG. 9. In other embodiments, rebound ledges 174 and 176 may be provided as safety measures in the event the latch hold 170 does not move with the designed speed.

Figure 2:
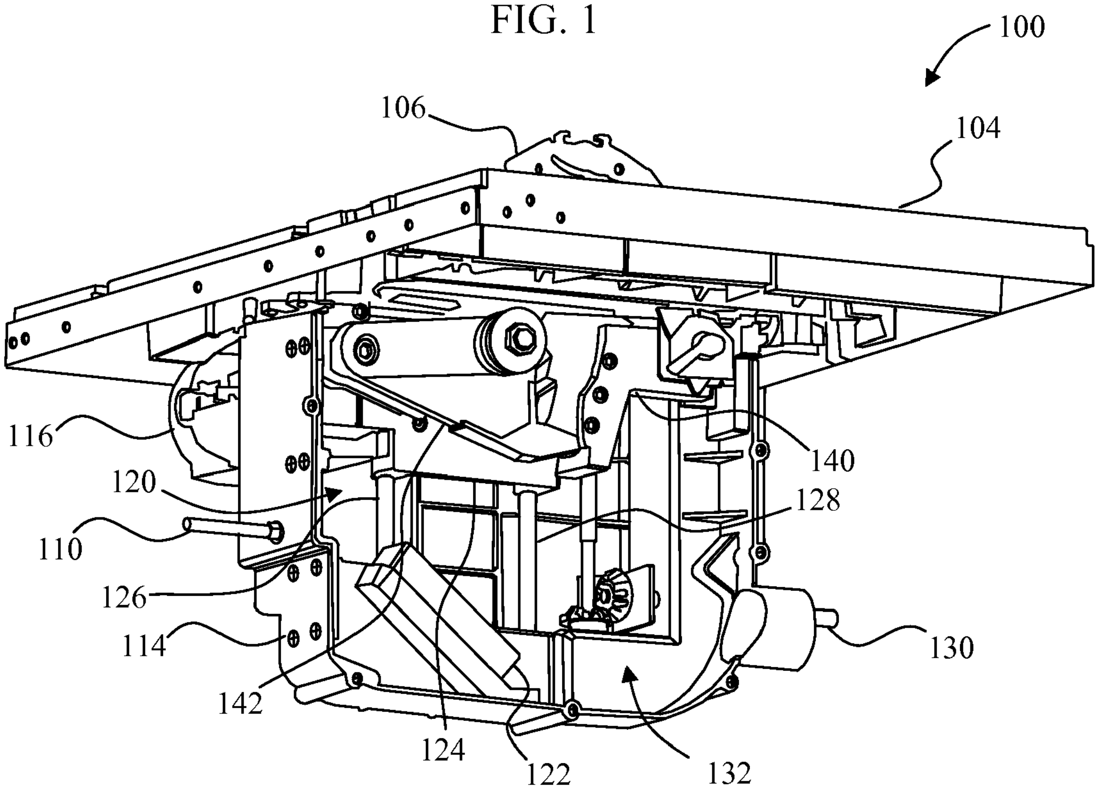
FIG. 2 depicts a bottom perspective view of the table saw of FIG. 1 with the housing removed showing a movable carriage mounted on a pivoting frame beneath the work-piece support surface.

The angle and length of the stop pad 122 are selected in the embodiment of FIG. 2 to ensure that the swing arm assembly 142 contacts the stop pad 122 at the foot 192 (see FIG. 3) regardless of the initial height of the carriage 124. Thus the foot 192 receives the force of the impact when the swing arm assembly 142 contacts the stop pad 122. Accordingly, while the materials used to form the foot 192, the strike plate 146, and the rebound plate 148 are selected to absorb multiple impacts, lighter materials may be used in other areas of the swing arm assembly 142 to minimize weight of the table saw 100.

Figure 10:
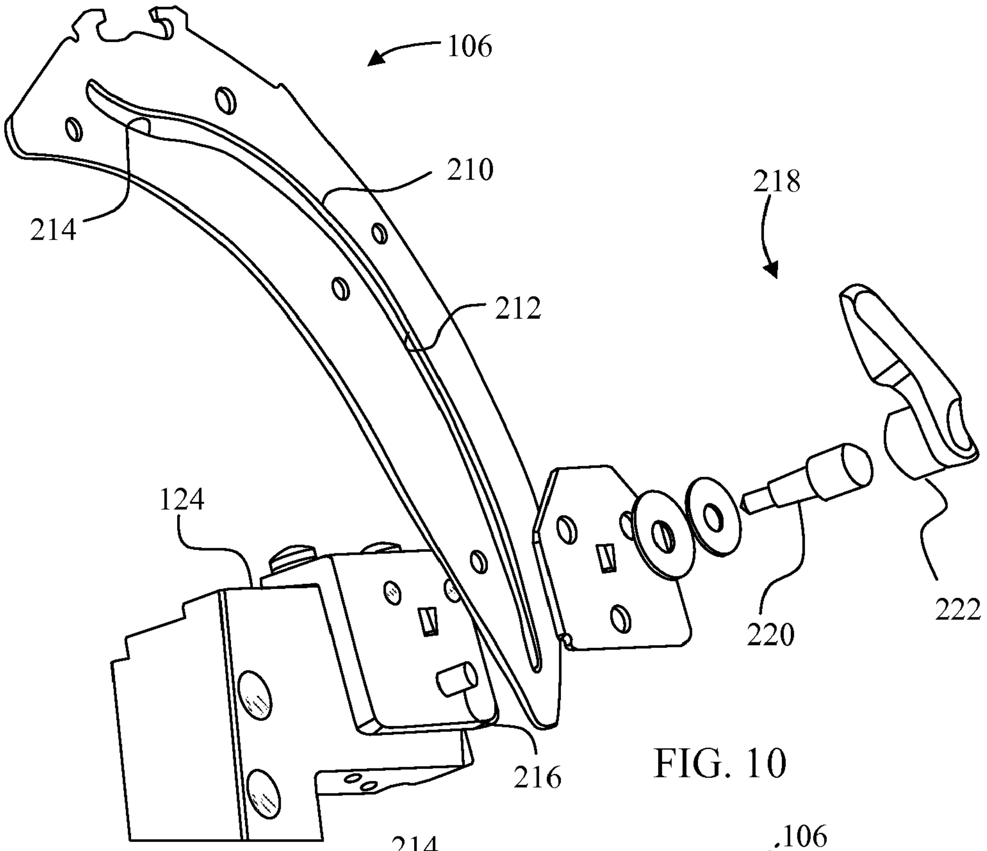
FIG. 10 depicts a perspective exploded view of the riving knife of FIG. 1.

The riving knife 106 is also configured for use with the movable carriage 124. Specifically, the riving knife 106 includes a channel 210 with a first curved portion 212 ands a second curved portion 214 as shown in FIG. 10. The riving knife is mounted on the table saw 100 using a pin 216 which is fixed with respect to the carriage 124 and a clamping member 218 which includes a cam portion 220 and a handle 222.

Figure 11:
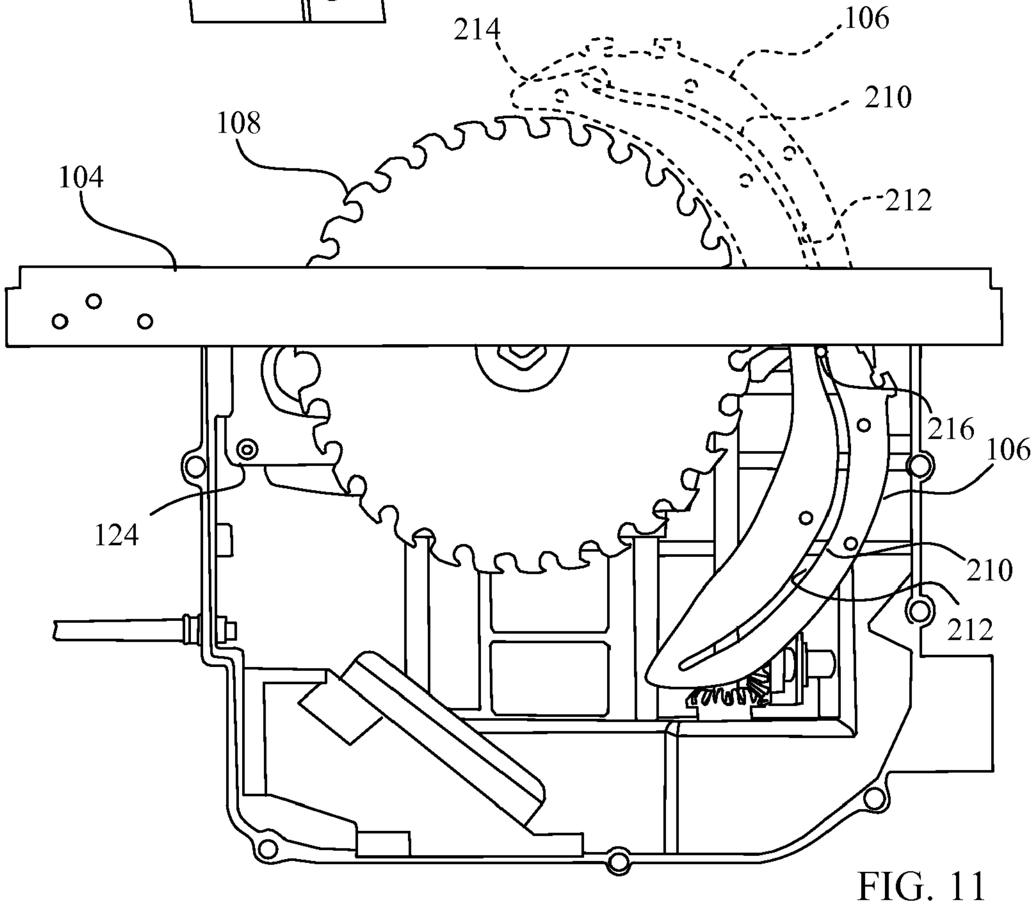
FIG. 11 depicts a bottom perspective view of the table saw of FIG. 1 with the housing removed showing the riving knife positioned beneath the work-piece support surface and pivoted away from the swing path.

When the riving knife 106 is mounted on the table saw 100, the pin 216 and the cam 220 extend through the channel 212. The handle 222 is used to clamp the riving knife 106 at the desired position. The riving knife 106 may thus be positioned above the blade 108 as shown in FIG. 2. The channel 210 allows the upper end of the riving knife 106 to be moved toward the work-piece support surface 104 and even below the work-piece support surface 104 as shown in FIG. 11. The curve of the curved portion 212 is selected to have an origin that at or near the axis of rotation of the blade 108. Accordingly, the distance between the riving knife 106 and the blade 108 remains substantially constant so long as the pin 216 and the cam portion 220 are located within the curved portion 212.

When positioned below the work-piece support surface 104, the pin 216 and the cam portion 220 are located within the second curved portion 214. The curved portion 214 has an origin which is different from the origin of the curved portion 212. In one embodiment, the origin of the curved portion 214 is on a side of the riving knife 106 opposite to side of the riving knife on which the origin of the curved portion 212 is located. Because the curved portion 214 is curved differently than the curved portion 212, the riving knife 106 is pivoted away from the swing path of the swing arm assembly 142, even when the carriage 124 is positioned at the lowest position.

Once the sensed condition has been cleared, the swing arm assembly 142 is reset by moving the latch hold 170 out of the swing path. This is effected by compressing the springs 188 and 186. The swing arm assembly 142 may then be rotated in a counterclockwise direction about the output shaft 152 until the rebound plate 148 is adjacent to the upper surface of the latch hold 170. The latch hold 170 is then released and the springs 188 and 186 bias the latch hold 170 about the pivot 190 into contact with the lip 164 of the swing arm assembly 142 which restricts rotation of the latch hold 170. Additionally, the swing arm assembly 142 is maintained in a latched position with the latch pin 166 resting on the latch ledge 170 as shown in FIG. 5.

The table saw 100 thus actively monitors for an unsafe condition and initiates mitigation action automatically in the event an unsafe condition is sensed. Additionally, movement and subsequent stopping of the swing arm assembly 172 is accomplished without requiring physical contact with the blade 108. Accordingly, the blade 108 is not damaged by the mitigation action.

Moreover, because the mitigation action does not require interaction with the blade 108, the mitigation system of the table saw 100 may be used with other shaping devices such as sanding wheels, blades with varying dado blades, and molding head cutters, without requiring any modification to the mitigation system. Additionally, because the moving components of the mitigation system can be mounted on the frame 114, the mitigation system can be used with any desired blade height or bevel angle.

The mitigation system discussed with respect to the table saw 100 can be implemented using very light materials, and is thus amenable to incorporation into a variety of power tools including bench top saws and portable saws. For example, the components which are subjected to increased stress within the mitigation system, such as the solenoid pin 184, the latch hold 170, the rebound plate 148, and the strike plate 146, can be made of more durable materials including metals to withstand the impacts and stresses of activating the mitigation system. Other components, including the housings, may be fabricated from more lightweight materials to minimize the weight of the power tool.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A table saw, comprising: a latch hold mechanism; a swing arm movable along a swing arm path between a first swing arm position adjacent the latch hold mechanism and a second swing arm position spaced apart from the latch hold mechanism;

said latch hold mechanism movable with respect to the swing arm;

a latch movable between a first latch position whereat the latch is engaged with the latch hold mechanism and the swing arm is maintained at the first swing arm position, and a second latch position whereat the latch is not engaged with the latch hold mechanism and the swing arm is not maintained at the first swing arm position;

an actuating device configured to transfer a force to the swing arm when the swing arm is maintained at the first swing arm position resulting in a bias on the latch in a direction toward the second latch position; and a control system configured to control the actuating device to transfer a force to the swing arm when the swing arm is maintained at the first swing arm position sufficient to move the latch from the first latch position to the second latch position.

2. The table saw of claim 1, wherein the latch hold mechanism is biased toward a first latch hold position whereat at least one portion of the latch hold mechanism is within the swing arm path.

3. The table saw of claim 2, further comprising:

a carriage movably mounted on a frame, wherein the latch hold mechanism and the swing arm are pivotably mounted on the carriage.

4. The table saw of claim 3, further comprising;

a work-piece support surface, wherein the frame is pivotable with respect the work-piece support surface.

5. The table saw of claim 2, wherein the at least one portion of the latch hold mechanism comprises:

a plurality of rebound ledges.

6. The table saw of claim 2, further comprising:

a rebound plate mounted on a portion of the swing arm such that when the latch hold mechanism is in the first latch hold position, the rebound plate is aligned with the at least one portion of the latch hold mechanism along the swing path, the rebound plate formed from a material that is harder than the portion of the swing arm.

7. The table saw of claim 1, further comprising:

a strike plate mounted on a portion of the swing arm such that when the swing arm is in the first swing arm position, the strike plate is aligned with the actuating device, the strike plate formed from a material that is harder than the portion of the swing arm.

8. The table saw of claim 1, further comprising:

a carriage movable along a first axis which intersects a work-piece support surface to a plurality of positions;

a frame supporting the carriage; and a stop pad mounted on the frame, wherein the swing arm is supported by the carriage and pivotable about a pivot axis extending generally parallel to the work-piece support surface, and movable along a plurality of swing arm paths, each of the plurality of swing arm paths associated with a respective one of the plurality of positions, and the stop pad is configured to intersect each of the plurality of swing arm paths.

9. The table saw of claim 1, further comprising:

a frame supporting the swing arm; and a stop pad mounted on the frame and aligned with the swing arm path.

10. The table saw of claim 1, further comprising:

a power wheel operatively connected to an output shaft of a motor;

a blade wheel supported by the swing arm; and a belt operatively connected to the power wheel and to the blade wheel.

11. The table saw of claim 1, wherein the output shaft defines a swing arm axis of rotation.

12. A table saw, comprising:

a latch hold mechanism;

a swing arm movable along a swing arm path between a first swing arm position adjacent the latch hold mechanism and a second swing arm position spaced apart from the latch hold mechanism;

a carriage movably mounted on a frame, wherein the latch hold mechanism and the swing arm are pivotably mounted on the carriage;

a latch movable between a first latch position whereat the swing arm is maintained at the first swing arm position,. and a second latch position whereat the swing arm is not maintained at the first swing arm position;

an actuating device configured to transfer a force to the swing arm when the swing arm is maintained at the first swing arm position; and a control system configured to control the actuating device to transfer a force to the swing arm when the swing arm is maintained at the first swing arm position.

13. The table saw of claim 12, wherein the latch hold mechanism is biased toward a first latch hold position whereat at least one portion of the latch hold mechanism is within the swing arm path.

14. The table saw of claim 13, wherein the at least one portion of the latch hold mechanism comprises:

a plurality of rebound ledges.

15. The table saw of claim 13, further comprising:

a rebound plate mounted on a portion of the swing arm and configured such that when the latch hold mechanism is in the first latch hold position, the rebound plate is aligned with the at least one portion of the latch hold mechanism along the swing path, the rebound plate formed from a material that is harder than the portion of the swing arm.

16. The table saw of claim 12, further comprising:

a frame supporting the swing arm; and a stop pad mounted on the frame and aligned with the swing arm path.

* * * * *